March 9, 1954 J. O. ALMEN 2,671,518
HYDRAULIC MOTOR ACTUATED MARINE PROPELLER PITCH CONTROL
Filed March 28, 1950 3 Sheets-Sheet 2
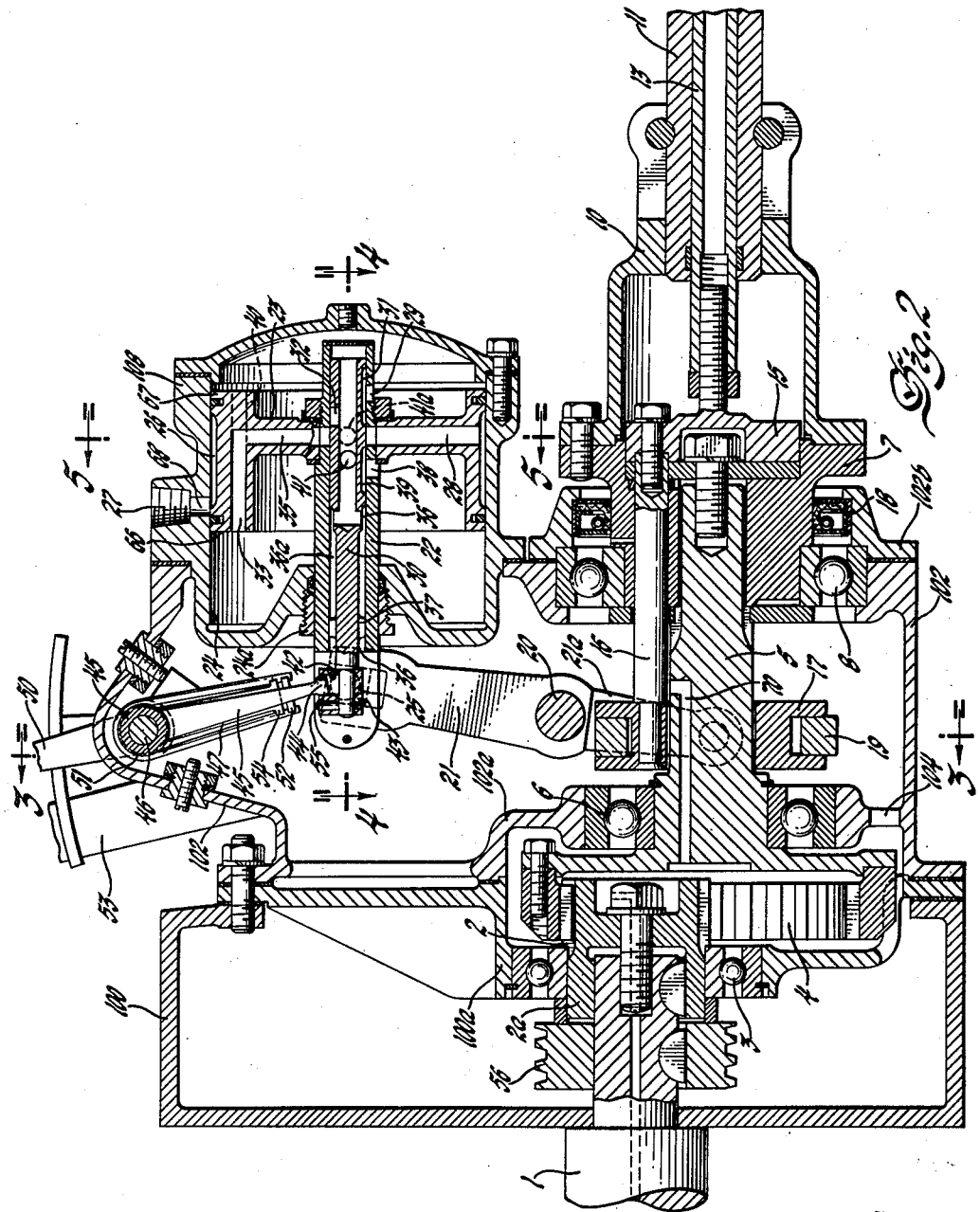
Inventor
John O. Almen
By Willits, Helwig & Baillio
Attorneys

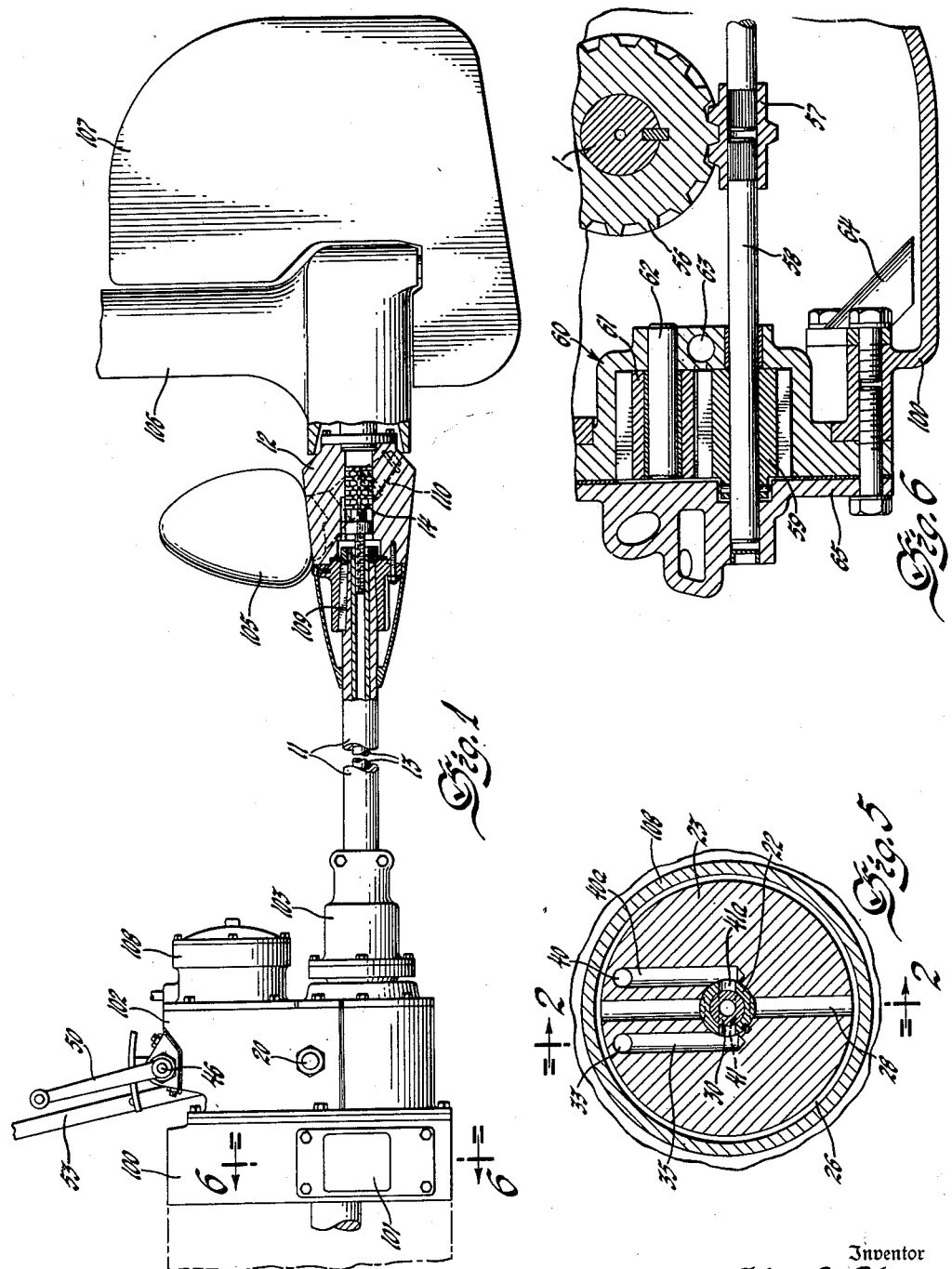

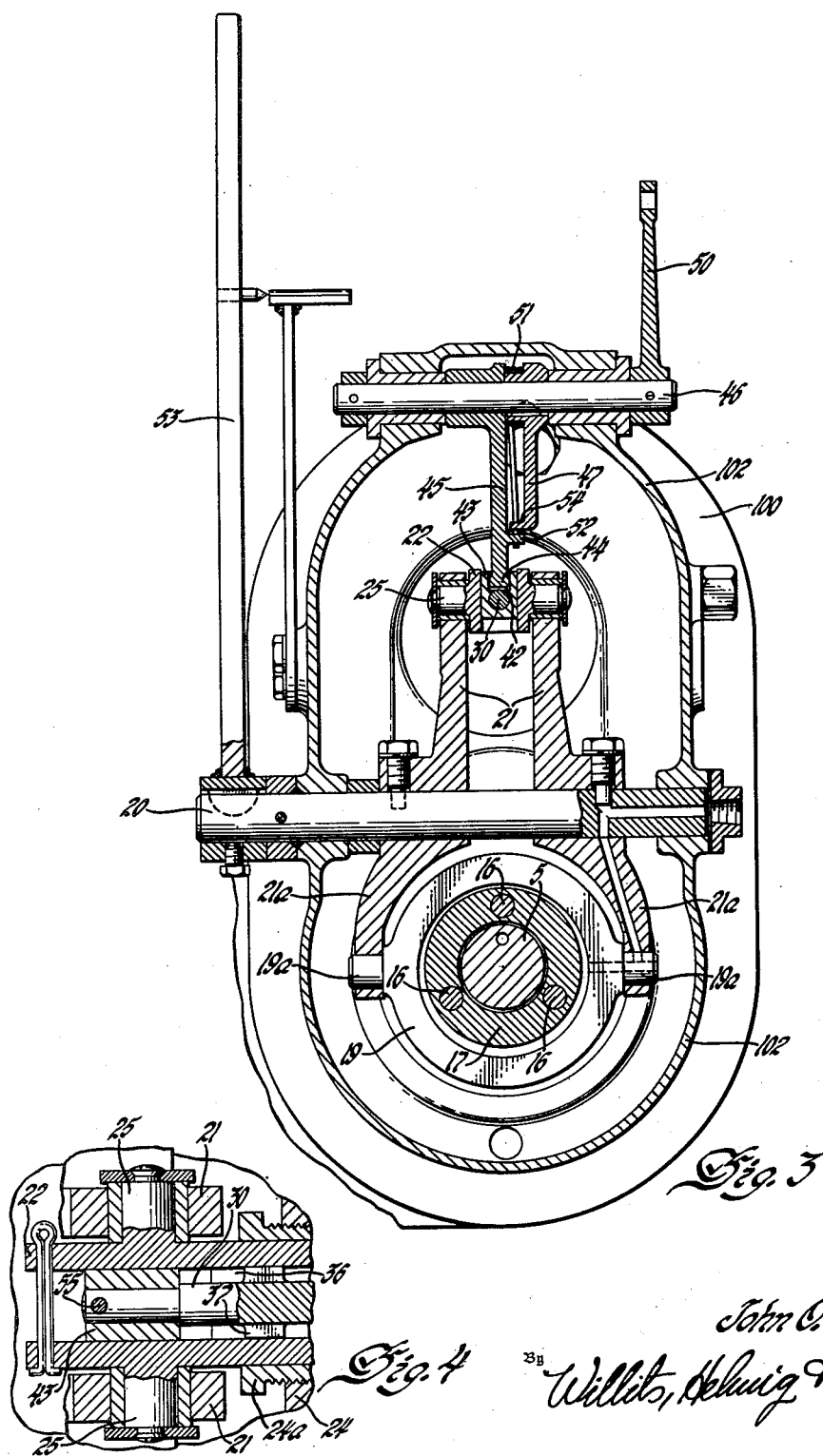

Patented Mar. 9, 1954

2,671,518

UNITED STATES PATENT OFFICE 2,671,518

HYDRAULIC MOTOR ACTUATED MARINE PROPELLER PITCH CONTROL

John O. Almen, Royal Oak, Mich., assignor to General Motors Corporation, Detroit, Mich., a corporation of Delaware Application March 28, 1950, Serial No. 152,379

10 Claims. (Cl. 170—160.37)

This invention relates to marine propeller drive mechanisms and more particularly to a fluid pressure actuator means for changing propeller blade pitch.

An object of this invention is to provide a propeller blade pitch control mechanism normally operable through fluid pressure actuation incorporating means whereby the propeller pitch may be set manually in the event of fluid pressure failure.

Another object of this invention is to provide a reduction drive and power delivery system in which means are provided for changing propeller pitch with simple, direct axial motion and incorporating a neat compact compartmenting of the units which provide these advantageous features for superior accessibility as well as for lubrication.

A further object of this invention is to provide a novel follow-up arrangement of pitch control mechanism involving fluid pressure valving and piston actuation which avoids creep and affords positive stationing of the control elements while giving rapid response when rapid shift is desired.

Still another object of this invention is to provide a balanced pressure condition for the fluid pressure servo system used to actuate and to hold propeller pitch change which avoids the need for constant force and stresses to be dealt with by the servo means.

An additional object of this invention is to provide in a servo mechanism of the class described, a piston having an annular inlet passage positioned intermediate spaced annular bosses in which the bosses are longitudinally so spaced as to meter inlet pressure utilized to cause movement of the piston in such a manner as to prevent pounding and shock as the piston approaches either extremity of its permissible length of travel.

These and other objects and advantages of this invention will be apparent from the following description and claims taken in conjunction with the following drawings in which:

Figure 1 is a side elevation of the invention as installed in a ship, with the propeller hub sectioned to show details of the pitch shifting mechanism.

Figure 2 is a vertical elevation of the pitch shift and actuator mechanism of Figure 1 in which the servo mechanism is taken substantially along the line 2—2 of Figure 5.

Figure 3 is a vertical cross section taken generally along the line 3—3 of Figure 2 including a section of the ball joint between the lever and the valve.

Figure 4 is a part section taken at 4—4 of Figure 2.

Figure 5 is a cross section taken at 5—5 of Figure 2.

Figure 6 is a partial transverse sectional view of the servo pump device taken at 6—6 of Figure 1.

Referring to Figure 1, there is shown a transmission housing 100, cover plate 101, servo control housing 102, stub-shaft housing 103, control handle 50, propeller or load shaft 11, propeller hub 12, propeller blade 105, rudder control housing 106, rudder 107 and servo cylinder 108. Propeller shaft 11 is splined to propeller hub 12 at 109 so that the hub rotates in a single direction along with propeller shaft 11. Positioned within hollow load shaft 11 is blade shifter rod 13, which, as explained hereafter in further detail, is positioned to move longitudinally with respect to shaft 11 to cause changes in pitch of the propeller blades. A rack 14 on one end of shift rod 13 and positioned within propeller hub 12, cooperates with teeth (not shown) on the propeller blade stub shaft 110 to vary the pitch of the blade. While only a single blade is shown, it will readily be understood that two or more blades would be used to make up the propeller. The rack and its relation to the propeller stub shaft per se is fully disclosed and described in the patent to Edward V. Rippingille 2,374,833 issued May 1, 1945, and does not constitute a part of this invention. The transmission, servo control and stub shaft housings and cover plate 101 are bolted together as shown to provide easy assembling and servicing of the device.

Referring to Figure 2, there is shown a power shaft 1 adapted to be connected to an engine shaft (not shown) having affixed thereto an external gear 2, the sleeve 2a of which is supported in bearing 3 held in flange 100a of casing 100. Gear 2 meshes with an internal gear 4 fixed on one end of an intermediate stub drive shaft 5, which drive shaft is supported in a bearing 6 held by flange 102a of casing 102. Shafts 1 and 5 are therefore disposed parallel to each other but are offset so that the center lines of the shafts are nonconcentric. Body 7, held in bearing 8 of housing 102 is splined to drive shaft 5 so as to rotate with the shaft and is bolted to clamp member 10 which in turn, drives hollow propeller shaft 11 fixed to propeller hub 12 of Figure 1. Gears 2 and 4 are lubricated through a passage 70 drilled in stub shaft 5 inside of bearing 6.

Blade shifter rod 13 is slidably supported inside hollow load shaft 11 for axial movement and extends to the left through clamp member 10 and terminates in a flanged member 15. Member 15 is connected by three rods 16 (see Figure 3) to a collar 17 slidably positioned upon shaft 5. Thus, any reciprocating movement that may be applied to collar 17 is transmitted to shift rod 13 through rods 16 and flange member 15.

As will be understood further, shifting of collar 17 by the blade pitch control means reciprocates rack 14 on the end of shift rod 13 to change and to hold the pitch of the propeller blades for all conditions of operation, including no-drive, forward, and reverse drive of the vessel.

A seal 18 is fitted between housing web 102b of casing 102 and splined body 7 to prevent leakage of bilge water into bearing 8 and the interior of the housing.

It is important to note a unique feature of this mechanism, namely, the arrangement of collar 17, rods 16, flange member 15, and seal 18 with respect to bearing 8. By this arrangement, the means by which the pitch shift means is actuated, including rack 14, operates inside of or through the bearing 8. Thus, a compact, durable, strong, and yet relatively light mechanism is provided which may be quickly and easily assembled or disassembled in the event that servicing is required.

A shift collar 19, fitted into the annular U-shaped groove of collar 17 is actuated to impart axial motion to collar 17, rods 16 fixed in collar 17, member 15, and shift rod 13.

As shown particularly in Figure 3, an actuator lever 21 is provided for imparting motion to shift collar 19. A cross shaft 20 pivotally mounted in housing 102 is attached to actuator lever 21 and provides a pivotal support for forked extensions 21a drilled out to receive studs 19a provided on shift collar 19.

Since the forces necessary to adjust the propeller pitch are greater than can conveniently be overcome by direct manual effort a hydraulic servo unit is utilized. The servo unit includes a piston 23 sliding in cylinder 24 of housing 108. A hollow piston rod 22 extends through a bushing 24a into the interior of housing 102 and is pivotally connected to actuator 21 by means of studs 25. As will be understood, fluid pressure applied to move piston 23 in cylinder 24, to station the piston at various selected positions in the cylinder, will cause collars 19 and 17 and, through the mechanism described, rod 13 and rack 14 to assume and hold different pitch for the drive of the propeller.

Hollow piston rod 22 encloses a valve mechanism 30 slidably positioned therein for compelling the piston under influence of directed fluid pressure to occupy positions in which the pressure on both sides of piston 23 is equalized. For this operation, piston 23 is provided with an annular space 26 connected by a suitable port 68 with a cylinder feed pressure port 27 which, in turn, is connected to a source of fluid pressure as may be supplied by a pump further described in connection with Figure 6. Annular space 26 communicates with a passage 28 drilled through the head of piston 23. A port 29 in the side wall of hollow piston rod 22 opens into the port 31 of valve member 30, to admit fluid pressure from passage 28 to the right hand side of piston 23 when valve 30 is moved to the left. As shown in Figures 2 and 5, a pair of discharge passages 33 and 35 are drilled in piston 23 to permit fluid pressure from the left side of the piston to escape. When the valve 30 is moved to the left to admit fluid pressure to the right hand side of piston 23, port 32 of the valve body registers with passage 35 of Figure 5 to admit discharge fluid into the interior of the hollow portion of valve 30. The discharge fluid thereupon passes through port 36 to hollow bore 36a, and hence past the radially spaced bosses 37 to the interior of housing 102.

For movement of piston 23 to the right, valve 30 is moved to the right, thereby connecting passage 28 to the left hand side of piston 23 through port 38 in the side wall of piston rod 22 and valve port 39. Fluid pressure from the right hand side of piston 23 is permitted to escape through drilled passages 40 and 40a (see Figure 5) drilled in piston 23. Port 41 in valve 30 is positioned to register with port 41a in the piston valve whenever ports 28 and 39 are in communication, thereby permitting discharge pressure from the right hand side of cylinder 23 to pass to the interior of the valve, through port 36, chamber 36a to the housing 102. The pump 60 of Figure 6 drains from casing 100 as a sump. Oil in the bottom of housing 102 is permitted to pass to housing 100 through passage 104 in the flange 102a.

It will be understood that when valve 30 is moved to lead the porting of rod 22, as described, piston 23 will continue to travel (to the left or right as the case may be) until the valve 30 blocks off pressure in passage 28, at which time the piston comes to rest in a given position such that the pump pressure is sealed off and the piston-to-valve relationship is stabilized at a new position. The outlet ports from either side of piston 23 are blocked off at the same time the passage 28 is cut off from either of the inlet ports 31 or 39 so as to trap fluid pressure both to the right and to the left of piston 23 to maintain the piston in its desired position in cylinder 24. Since the fluid pressure acting on opposite faces of the piston is the same, the piston is simply fixed at its desired location without being subject to unbalanced fluid pressure forces as it maintains the propeller blades at any predetermined pitch.

It is important to note the relationship of the spaced annular bosses 66 and 67 and the length of annular passage to port 68. As will be apparent in Figure 2, piston 23 is capable of traveling from one end of cylinder 24 to the other. It is highly desirable that any sharp or hard impact of piston and either end of cylinder 24 be avoided. Bosses 66 and 67 and the length of annular passage 26 are so arranged that one of the bosses (depending upon the direction of travel of the piston) will partially cut off port 68 to meter inlet pressure fed to passage 26 as the piston approaches an end of cylinder 24. Thus, in the position shown, boss 66 partially cuts off inlet port 68 as the piston approaches the right hand end of the cylinder. The piston 23, therefore, will reduce its rate of travel as it approaches the end of the cylinder even though valve 30 may be positioned to admit inlet pressure to the left hand side of piston 23. In this manner, pounding and sharp impact of the piston on either end of the cylinder is avoided. It will further be understood that at no time do either of the annular bosses 66 or 67 completely block off port 68, and that the bosses merely act to meter the inlet pressure to provide for reduced rate of travel of the piston as it approaches either end of cylinder 24.

The leftward end of valve 30 terminates in a slot 42 and is located in fork 43 of lever 21 as best disclosed in Figure 3, to accommodate ball end 44 of lever 45 freely pivoted on cross shaft 46 mounted in casing 102.

External lever 50 is keyed to shaft 46 which in turn is keyed to lever 47 extending downwardly into the casing 102. A spring 51 is disposed intermediate levers 45 and 47 to provide a lost motion connection, the spring being wound around shaft 46 with its ends depending downwardly to engage laterally extending bosses 52 and 54 on levers 45 and 47, respectively. This arrangement permits the external control mechanism to maintain a lead over the follower action of the piston and rod system. Since the spring 51 engages both levers 45 and 47, lever 45 will be rotated about shaft 46 by the downwardly extending ends of the spring whenever lever 50 is moved to a new position.

It is likewise provided that in the case of fluid pressure failure, a clamp bar 53, shown in Figure 3, may be clamped on one end of cross shaft 20 to manually rock lever 21 to change blade pitch. Figure 4 shows the arrangement of the various parts at the left end of valve 30 in more detail. As shown, rod 22 carries studs 25 pivotally connecting the rod to lever 21 while valve 30 is pinned by means of pin 55 (see also Figure 2) to fork 43.

Figure 6 shows a pump assembly 60 driven from gear 56 keyed to shaft 1. Small gear 57 keyed to cross shaft 58 meshes with and is driven by gear 56, thereby driving shaft 58 and primary gear 59 of the pump. Pump idler gear 61 mounted on stub shaft 62 and gear 59 create oil pressure in output passage 63 which in turn is connected by a pipe (not shown) to port 27 in the top of servo cylinder 24 of Figure 2. The pump draws oil from casing 100 through suction pipe 64 and delivers it to passage 63 under pressure. Any conventional pump output line pressure regulating valving may be utilized to maintain a constant input pressure to port 27. Cover plate 101 of Figure 1 is external to the pump assembly 60 and, when removed, enables pump flange 65 and the entire pump assembly to be easily removed for ready inspection and repair.

From the foregoing description, it will readily be apparent that there has thus been provided a novel blade pitch control mechanism which is particularly adapted to be actuated by fluid pressure but which may manually be actuated in the event of fluid pressure failure. It is believed to be particularly novel to position the actuating means so that it is supported by and extends through a bearing as shown. Such an arrangement is advantageous in that it is strong and compact and yet can be quickly and easily assembled and disassembled for service or inspection. The various housings and the functional machinery enclosed therein may also be quickly assembled or disassembled as desired. The machine is, therefore, particularly designed to facilitate quick and simple repair in that any single defective unit may be quickly replaced. The piston 23 is maintained in any desired position in the cylinder through the action of equal fluid pressure forces acting on opposite faces of the piston, the arrangement forming a fluid pressure trap such that creep is avoided as is the need for constantly maintaining a given pressure directly from the fluid pressure source when the valving is positioned to maintain the piston in a given position. In addition, the bosses at each end of the annular passage in the servo piston are so positioned with respect to the fluid pressure inlet port as to reduce the effective area of the inlet port as the piston approaches either end of the cylinder. In this manner all knocking and shock which might otherwise accrue is prevented.

What is claimed is:

1. In a drive control system for marine propulsion, a variable pitch change propeller mechanism adapted to provide forward and reverse propulsion from a power plant constantly rotating in one direction, a housing, laterally spaced bearings in said housing, a power shaft, a propeller shaft, a bushing connecting said power shaft to said propeller shaft, said bushing extending through one of said bearings for support upon said housing, shift rods extending through said bushing and said bearing for reciprocating motion with respect thereto for adjusting propeller pitch, a longitudinally reciprocable collar carried by said power shaft connected to said shift rods, means connecting said shift rods to said propeller pitch change mechanism, a fluid pressure source, a fluid pressure responsive servo, a cross shaft supported upon said housing, an actuator lever rotatably mounted upon said cross shaft operatively connected to said collar for imparting longitudinal motion to said collar, means operably connecting said actuator lever to said servo, a manually operable propeller pitch selector lever, and a manually operable self-lapping valve having a ported valve body connected to said propeller pitch selector lever for controlling the admission of fluid pressure to said servo, said valve having ported portion thereof connected to said actuator lever effective to block off said ports to trap pressure fluid in said servo to positively maintain the propeller pitch setting selected by said propeller pitch selector lever.

2. In actuation and control systems for marine propellers, the combination of an engine shaft, an intermediate shaft, a hollow propeller shaft, a hub and dirigible propeller blades socketed in said hub, means having a connection through said hollow shaft with said blades for controllably rocking the same to different forward and reverse pitch positions, means coupling said intermediate shaft and said propeller shaft, a source of fluid pressure, a fluid pressure responsive motor operably connected to said propeller pitch control means, said motor comprising a piston slidable in a ported cylinder and having a piston rod connected to said propeller pitch control means, a bore in said piston rod, passage forming means in said piston for admitting fluid pressure from said source to said piston rod, a ported valve body slidably movable in said piston rod for controlling the admission of pressure fluid from said bore to said fluid motor, manually operable control means for moving said valve body independently of said piston rod, said valve body being effective in one position thereof in said piston rod to block off said ports to trap fluid pressure at opposite sides of said piston to maintain the propeller pitch setting determined by said manually operable means.

3. In controls for changing the pitch of marine propeller blades, the combination of a marine propeller consisting of a hub equipped with blades rockable to forward and reverse pitch positions and a hollow propeller shaft containing a member connected to rock said blades through equal angles, a source of fluid pressure, fluid servo actuator means operative upon said member to shift and to hold said blades in selected pitch positions, said fluid servo actuator means comprising a cylinder, a piston, and a ported piston rod operatively connected to said blade rocking member, control means for said fluid servo actuator effective to vary propeller pitch, said control means comprising a ported valve body positioned within said piston rod and movable to selectively direct pressure fluid from said source to opposite sides of said piston, said piston rod being effective in one position thereof to block off said ports to trap fluid pressure at opposite sides of said piston, a manual control connected to said valve body for selectively positioning said valve body to actuate said servo, and manual means operable independently of said fluid servo to shift said propeller rocking member when said fluid servo actuation means is ineffective.

4. In a drive control system for marine propulsion, a propeller pitch change mechanism adapted to provide forward and reverse propulsion, a housing, a power shaft extending through said housing and terminating adjacent one end of said housing, a propeller drive shaft, means including a body member connecting said power shaft to said propeller drive shaft, a bearing in said housing, an extension on said body member positioned between said bearing and said power shaft for support upon said housing, a propeller pitch control shaft connected to said propeller pitch change mechanism, a rod member extending through body member and movable with respect thereto, detachable means connecting said rod member to said propeller pitch control shaft, a collar carried by said power shaft connected to said rod member, and hydraulically actuated lever mechanism connected to said collar for moving said rod member through said body member to vary the propeller pitch.

5. In a drive control system for marine propulsion, a propeller pitch change mechanism adapted to provide forward and reverse propulsion, a housing, an engine driven shaft extending through said housing and terminating adjacent one end of said housing, a power shaft extending through the opposite end of said housing, gears on said engine shaft and said power shaft for drivingly connecting said shafts to each other, said housing having a detachable portion whereby said engine shaft and the gear carried thereby may be removed as a unit from the remainder of said housing, a propeller drive shaft external of said housing, a bearing in said housing, detachable means including a body member connecting said power shaft to said propeller drive shaft, said body member having a portion extending between said bearing and said power shaft for support upon said housing, a propeller pitch control shaft connected to said propeller pitch change mechanism, a rod member extending through said bushing, detachable means connecting said rod member to said propeller pitch control shaft, a collar carried by said power shaft connected to said rod member, a source of incompressible fluid pressure, a fluid pressure responsive servo member operatively connected to said collar, and a manually controlled self-lapping valve for controlling the admission of fluid pressure to said servo to determine the propeller pitch.

6. In a control system for controlling the pitch of marine propeller blades, a propeller having a hub equipped with blades rockable to forward and reverse pitch positions, a propeller pitch control shaft, mechanism connecting said propeller pitch control shaft to said propeller blades to control propeller pitch, a pump for supplying incompressible fluid under pressure, a fluid pressure responsive servo motor having a piston and a pair of control chambers adapted to receive fluid under pressure, a piston rod carried by said piston, means including linkage connecting said piston rod to said propeller pitch control shaft, manually movable control valve body within said piston rod, ports in said valve body and piston rod for controlling the admission of fluid pressure and exhaust of fluid pressure from said chamber, said valve body being effective in one position thereof to position said ports to admit fluid pressure from said pump to one of said chambers and to simultaneously connect another of said chambers to exhaust, said valve being movable to a second position to position said ports to connect said one chamber to exhaust and to connect said other chamber to said pump, said piston rod being movable by said piston to block off said ports to trap said incompressible fluid in both of said chambers to maintain the propeller pitch setting selected by said valve body.

7. In a drive control system for marine propulsion, a propeller pitch change mechanism adapted to provide forward and reverse propulsion from a power plant constantly rotating in one direction, a housing, a bearing in said housing, a propeller drive shaft external of said housing, a power shaft extending through said housing, means including a body member supporting said power shaft and connecting said power shaft to said propeller drive shaft, said body member having a portion thereof positioned between said bearing and said power shaft for support upon said housing, a shift rod extending through said body member for reciprocatory motion with respect thereto, means connecting said shift rod to said propeller pitch change mechanism, a source of incompressible fluid pressure, a fluid pressure responsive servo having a piston and a pair of control chambers associated with said piston, a longitudinally reciprocable collar carried by said power shaft and connected to said shift rod, a piston rod fixed to said piston, linkage mechanism connecting said collar to said piston rod for reciprocating said collar, a valve body carried by said piston rod, manually operable means for moving said valve body with respect to said piston rod, and ports in said piston rod and said valve body for controlling the admission of fluid pressure to and exhaust of fluid pressure from said chambers, said valve body being effective in one position to align said ports to admit fluid pressure to one of said chambers and to connect the other of said chambers to exhaust, said valve being effective in a second position to align said ports to connect said one chamber to exhaust and to admit fluid pressure to said other chamber, said valve body being effective in a third position to position said ports to trap incompressible fluid in both of said chambers and to block off both of said chambers from said fluid pressure source.

8. In a drive control system for marine propulsion, a propeller pitch change mechanism adapted to provide forward and reverse propulsion from a power plant constantly rotating in one direction, a housing, a bearing in said housing, a propeller drive shaft external of said housing, a power shaft extending through said housing, means including a body member supporting said power shaft and connecting said power shaft to said propeller drive shaft, said body member having a portion thereof positioned between said bearing and said power shaft for support upon said housing, a shift rod extending through said body member for reciprocatory motion with respect thereto, means connecting said shift rod to said propeller pitch change mechanism, a source of incompressible fluid pressure, a fluid pressure responsive servo having a piston and a pair of control chambers associated with said piston, a longitudinally reciprocable collar carried by said power shaft and connected to said shift rod, a piston rod fixed to said piston, linkage mechanism connecting said collar to said piston rod for reciprocating said collar, a valve body carried by said piston rod, manually operable means for moving said valve body with respect to said piston rod, and ports in said piston rod and said valve body for controlling the admission of fluid pressure to and exhaust of fluid pressure from said chambers, said valve body being effective in one position to align said ports to admit fluid pressure to one of said chambers and to connect the other of said chambers to exhaust, said valve being effective in a second position to align said ports to connect said one chamber to exhaust and to admit fluid pressure to said other chamber, said piston rod being movable by said piston to position said ports to trap incompressible fluid in both of said chambers and to block off both of said chambers from said fluid pressure source.

9. In a drive control system for marine propulsion, a propeller pitch change mechanism adapted to provide forward and reverse propulsion from a power plant constantly rotating in one direction, a housing, a bearing in said housing, a propeller drive shaft external of said housing, a power shaft extending through said housing, means including a body member supporting said power shaft and connecting said power shaft to said propeller drive shaft, said body member having a portion thereof positioned between said bearing and said power shaft for support upon said housing, a shift rod extending through said body member for reciprocatory motion with respect thereto, means connecting said shift rod to said propeller pitch change mechanism, a source of incompressible fluid pressure, a fluid pressure responsive servo having a piston and a pair of control chambers associated with said piston, a longitudinally reciprocable collar carried by said power shaft and connected to said shift rod, a piston rod fixed to said piston, linkage mechanism connecting said collar to said piston rod for reciprocating said collar, a valve body carried by said piston rod, manually operable means for moving said valve body with respect to said piston rod, and ports in said piston rod and said valve body for controlling the admission of fluid pressure to and exhaust of fluid pressure from said chambers, said valve body being manually movable in one direction to align said ports to connect one of said chambers to said fluid pressure source and to connect the other of said chambers to exhaust, said valve body being manually movable in the opposite direction to align said ports to connect said one chamber to exhaust and to connect said other chamber to said fluid pressure source, said piston rod being movable in response to motion of said piston to block off both of said chambers from said fluid pressure source and to position said ports to trap fluid pressure in both of said chambers.

10. In a drive control system for marine propulsion, a propeller pitch change mechanism adapted to provide forward and reverse propulsion from a power plant constantly rotating in one direction, a housing, a bearing in said housing, a power shaft, a propeller shaft, a bushing connecting said power shaft to said propeller shaft, said bushing extending through said bearing for support upon said housing, shift rods extending through said bushing for reciprocatory motion with respect thereto for adjusting propeller pitch, a longitudinally reciprocable collar carried by said power shaft connected to said shift rods, means connecting said shift rods to said propeller pitch change mechanism, a source of incompressible fluid pressure, a fluid pressure responsive servo having a piston and a pair of control chambers associated with said piston, a cross shaft supported upon said housing, an actuator lever rotatably mounted upon said cross shaft operatively connected to said collar for imparting longitudinal motion to said collar, a hollow stem connecting said actuator lever to said piston, a manually operable propeller pitch selector lever, a valve body connected to said propeller pitch selector lever positioned within said hollow stem member, ports in said stem and said valve body for controlling the admission of fluid pressure to and exhaust of fluid pressure from said chambers, said stem being movable in response to movement of said piston to position said ports to trap fluid pressure in both of said chambers to positively maintain the propeller pitch setting selected by said valve body.

JOHN O. ALMEN.

References Cited in the file of this patent
UNITED STATES PATENTS

| Number | Name | Date |
|---|---|---|
| 571,745 | Brinkmann | Nov. 24, 1896 |
| 766,953 | Krebs | Aug. 9, 1904 |
| 1,365,347 | Schneider | Jan. 11, 1921 |
| 1,475,869 | Petrie | Nov. 27, 1923 |
| 2,010,640 | Michl | Aug. 6, 1935 |
| 2,244,770 | Englesson | June 10, 1941 |
| 2,374,833 | Rippingille | May 1, 1945 |
| 2,480,521 | Thompson | Aug. 30, 1949 |
| 2,495,493 | Herreshoff | Jan. 24, 1950 |